(12) United States Patent
Huskamp et al.

(10) Patent No.: US 7,509,725 B2
(45) Date of Patent: Mar. 31, 2009

(54) DESIGN METHODOLOGY TO MAXIMIZE THE APPLICATION OF DIRECT MANUFACTURED AEROSPACE PARTS

(75) Inventors: Christopher S. Huskamp, Belleville, IL (US); Victor Blakemore Slaughter, Manchester, MO (US)

(73) Assignee: The Boeing Company, Chicago, IL (US)

( * ) Notice: Subject to any disclaimer, the term of this patent is extended or adjusted under 35 U.S.C. 154(b) by 662 days.

(21) Appl. No.: 10/907,973

(22) Filed: Apr. 22, 2005

(65) Prior Publication Data
US 2006/0236544 A1 Oct. 26, 2006

(51) Int. Cl.
*B21D 39/02* (2006.01)
(52) U.S. Cl. .................................................. 29/463
(58) Field of Classification Search ................ 29/897.3, 29/523, 428, 432.1, 437, 463; 285/123.16; 264/497
See application file for complete search history.

(56) References Cited

U.S. PATENT DOCUMENTS

| | | | |
|---|---|---|---|
| 3,038,702 A * | 6/1962 | Trunnell | 254/134.3 FT |
| 4,863,538 A | 9/1989 | Deckard | |
| 5,017,753 A | 5/1991 | Deckard | |
| 5,132,143 A | 7/1992 | Deckard | |
| 5,252,264 A * | 10/1993 | Forderhase et al. | 264/497 |
| 5,342,919 A | 8/1994 | Dickens, Jr. et al. | |
| 5,549,416 A * | 8/1996 | Thomas et al. | 405/153 |
| 5,639,070 A | 6/1997 | Deckard | |
| 5,678,162 A | 10/1997 | Barlow et al. | |
| 5,733,497 A | 3/1998 | McAlea et al. | |
| 5,749,041 A | 5/1998 | Lakshminarayan et al. | |
| 5,990,268 A | 11/1999 | Dickens, Jr. et al. | |
| 6,136,948 A | 10/2000 | Dickens, Jr. et al. | |
| 6,245,281 B1 | 6/2001 | Scholten | |
| 2004/0021256 A1 | 2/2004 | DeGrange et al. | |

FOREIGN PATENT DOCUMENTS

EP 0703036 A 3/1996

OTHER PUBLICATIONS

German Document No. XP 000656866, Schmachtenberg, E. et al. "Laser-Sintering of Polyamide", Kunstoffe 87 (1997), pp. 773, 774 and 776, Carl Hanser Verlag, Munich, Germany.
German Document No. XP 002213140, Keller, Peter "Der Stoff, aus dem die Prototypen sind (Material from which prototypes are made)" Kunstoffe 89 (1999), pp. 58-61, Carl Hanser Verlag, Munich, Germany.

* cited by examiner

*Primary Examiner*—John C Hong
(74) *Attorney, Agent, or Firm*—Ostrager Chong Flaherty & Broitman P.C.

(57) ABSTRACT

In accordance with the present invention a method for the direct manufacture of aerospace duct elements is provided comprising executing a single build run on a build chamber using direct fabrication technology to generate at least one duct section. The at least one duct section is generated by forming a plurality of partial cylinder duct segments orientated within the build chamber in a nested arrangement during the single build run, and assembling at least two of the partial cylinder duct segments to form the duct section. The duct section has a duct cross-sectional profile larger than a build chamber profile.

31 Claims, 5 Drawing Sheets

DESIGN METHODOLOGY TO MAXIMIZE THE APPLICATION OF DIRECT MANUFACTURED AEROSPACE PARTS

TECHNICAL FIELD

The present invention relates generally to a method for the direct manufacturing of oversized aerospace parts, and more particularly to a method for the direct manufacturing of oversized aerospace parts using a single build run.

BACKGROUND OF THE INVENTION

Aerospace and military applications often provide unique challenges to design and manufacturing. The nature of these applications often requires limited run and small-lot productions that result in high cost because of the small quantity of individualized assemblies. Part cost can be extremely expensive due to the cost of tooling and long lead-time associated with developing and fabricating the tooling. By way of example, aerospace environmental control system ducts are commonly laid up using fiberglass lay-up techniques. Reliable and durable tooling is necessitated for this manufacturing technique. When multiple aircraft designs are implemented, then multiple specialized tools and lay-up procedures are also required. This quickly generates negative cost implications on part manufacturing.

Direct manufacturing has the ability to open the doors for short lead time, too-less manufacturing of aerospace components. Existing applications, however, are frequently limited due to practical and existing size constraints on the build chamber or pool. The usable size on the build chambers commonly limits their application to relatively small-sized parts. Additionally, multi-part elements may require individual builds using direct manufacturing and thereby generate undue cost increases. The present invention seeks a unique methodology of harnessing the direct build methodology while overcoming limitations generated by the limited build chamber sizing. In addition, the present invention seeks a method for producing oversized direct manufacture elements while minimizing the required number of full height builds.

What is needed is a method for manufacturing oversized components within a reduced size build chamber. Additionally, it would be highly desirable to have a method manufacturing such components with a single build run. If such a system were developed it would eliminate the costs associated with specialized tooling, long lead time development, and large inventory.

SUMMARY OF THE INVENTION

In accordance with the present invention a method for the direct manufacture of aerospace duct elements is provided comprising executing a single build run on a build chamber using direct fabrication technology to generate at least one duct section. The at least one duct section is generated by forming a plurality of partial cylinder duct segments orientated within the build chamber in a nested arrangement during the single build run, and assembling at least two of the partial cylinder duct segments to form the duct section. The duct section has a duct cross-sectional profile larger than a build chamber profile.

Other objects and features of the present invention will become apparent when viewed in light of the detailed description and preferred embodiment when taken in conjunction with the attached drawings and claims.

DESCRIPTION OF PREFERRED EMBODIMENTS

Figure 1:
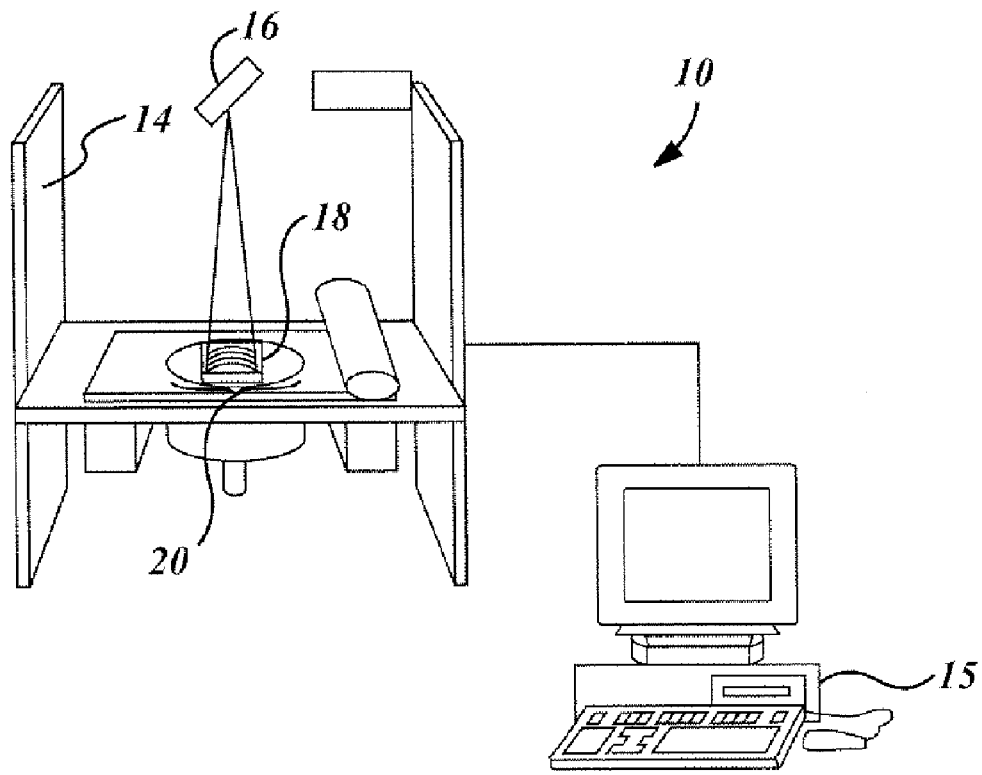
FIG. 1 is an illustration of a method for the direct manufacture of aerospace duct elements in accordance with the present invention.

Referring now to FIG. 1, which is an illustration of a method for the direct manufacture of aerospace elements 10 in accordance with the present invention. The method is intended for the manufacture of oversized elements 12 such as aerospace duct sections or other aerospace cylindrical elements. The method utilizes a direct manufacturing assembly 14 such as a selective laser sintering assembly to generate the aerospace duct elements 12 in a single build run controlled by a computer assembly 15. Selective laser sintering assemblies 14 utilize a laser 16 to directly product solid structures within a build chamber 18 during the build run. The build chamber 18 (or pool) has a build chamber profile 20 that is commonly too small for the manufacturing of oversized objects during single runs. Although laser sintering has been described, the present invention contemplates other layer build methodologies.

Figure 2:
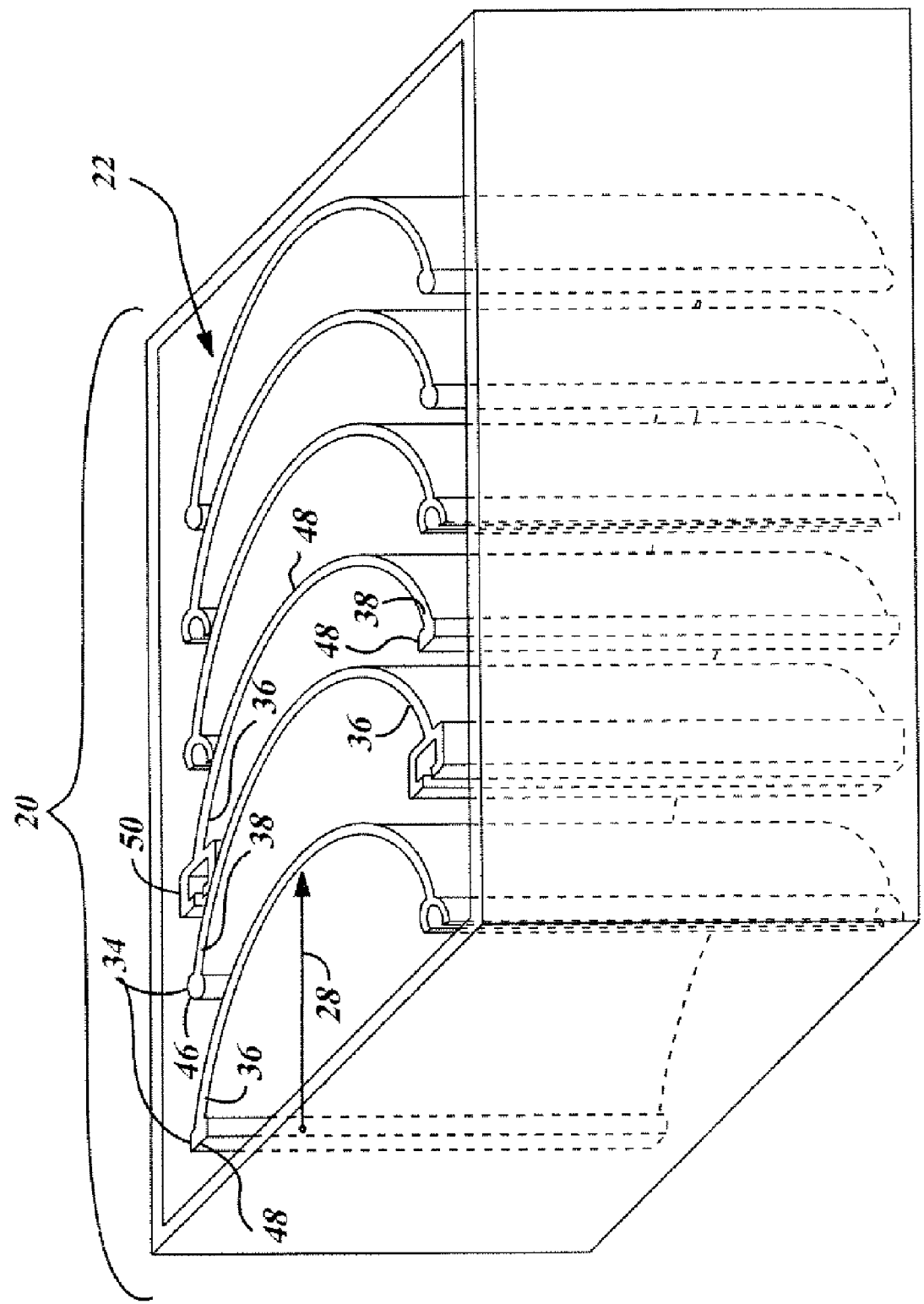
FIG. 2 is a detailed illustration of the build chamber utilized in the direct manufacturing method illustrated in FIG. 1.
Figure 5:
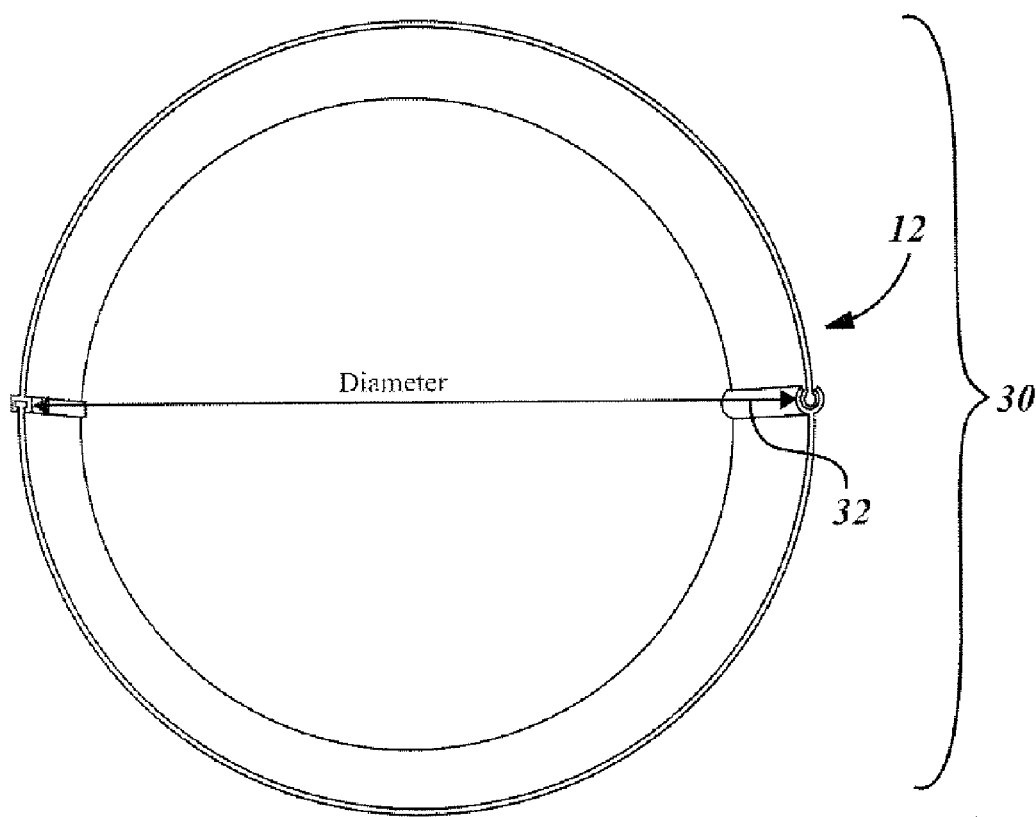
FIG. 5 is an illustration of the assembled duct section assembled form the partial cylinder duct segments manufactured in FIG. 1.
Figure 7:
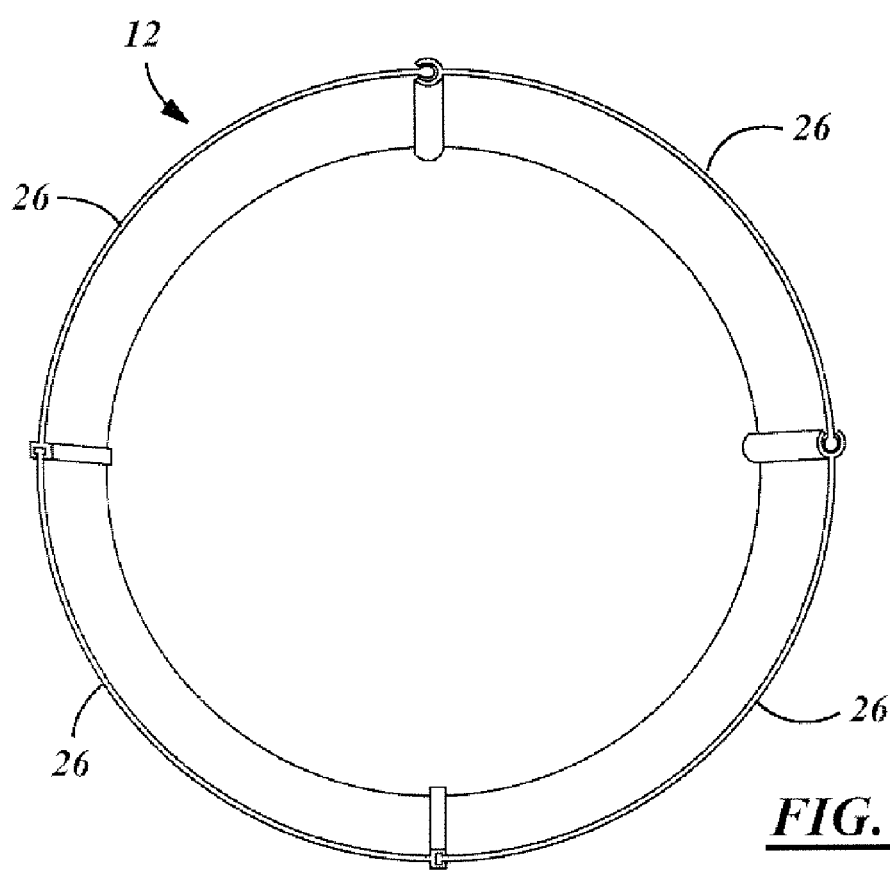
FIG. 7 is an illustration of an alternate embodiment of the assembled duct section, the assembled duct section comprising a plurality of quarter cylinder duct segments.

The present method addresses this existing limitation caused by small build chamber profiles 20 by way of forming the aerospace duct sections 12 as a plurality of partial cylinder duct segments 22 (partial cylinder segments, partial segments) formed during a single build run within the build chamber 18. The partial cylinder duct segments 22 are a portion of a cylinder defined by cutting a cylinder parallel to its primary axis. An example of half cylinder duct segments 24 (FIG. 2) and quarter cylinder duct segments 26 (FIG. 7) are only two of the many contemplated embodiments. The advantage of using these partial segments 22 is that they may have segment effective radii 28 maximized to make most efficient use of the build chamber profile 20. Thus when the partial segments 22 are joined to form the aerospace duct section 12, a resultant duct section 12 can have a duct cross-sectional profile 30 (FIG. 5) significantly larger than the build chamber profile 20.

Although a variety of arrangements may be used to build the plurality of partial cylinder duct segments 22 in a single build run, one embodiment (see FIG. 2) contemplates the use of a nested arrangement of the duct segments 22 during the build run. This will allow a plurality of duct segments 22 to be manufactured simultaneously and even possibly a plurality of duct sections 12. Thus, each build run is maximized for efficiency and cost effectiveness. Additionally, it is contemplated the segment effective radii 28 may be varied such that an even greater number of duct segments 22 may be simultaneously manufactured within the build chamber 18. Additionally, the use of varied effective radii 28 allows the simultaneous production of duct sections 12 with varying duct diameters 32.

Figure 3:
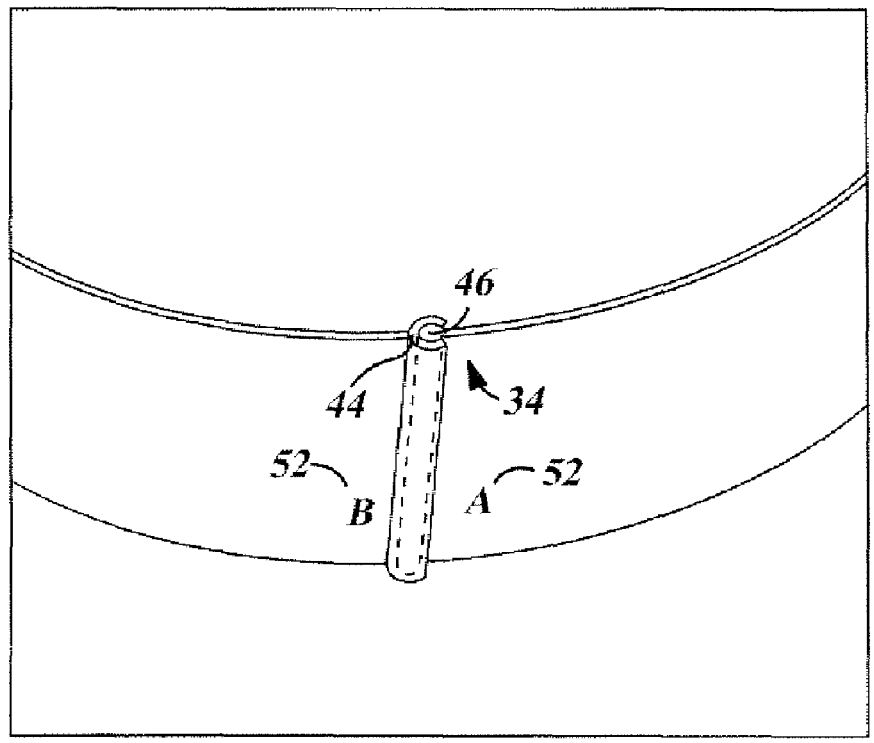
FIG. 3 is a detailed illustration of the assembled duct section assembled from the partial cylinder duct segments manufactured in FIG. 1, the detail illustrating a cup and ball configuration.
Figure 4:
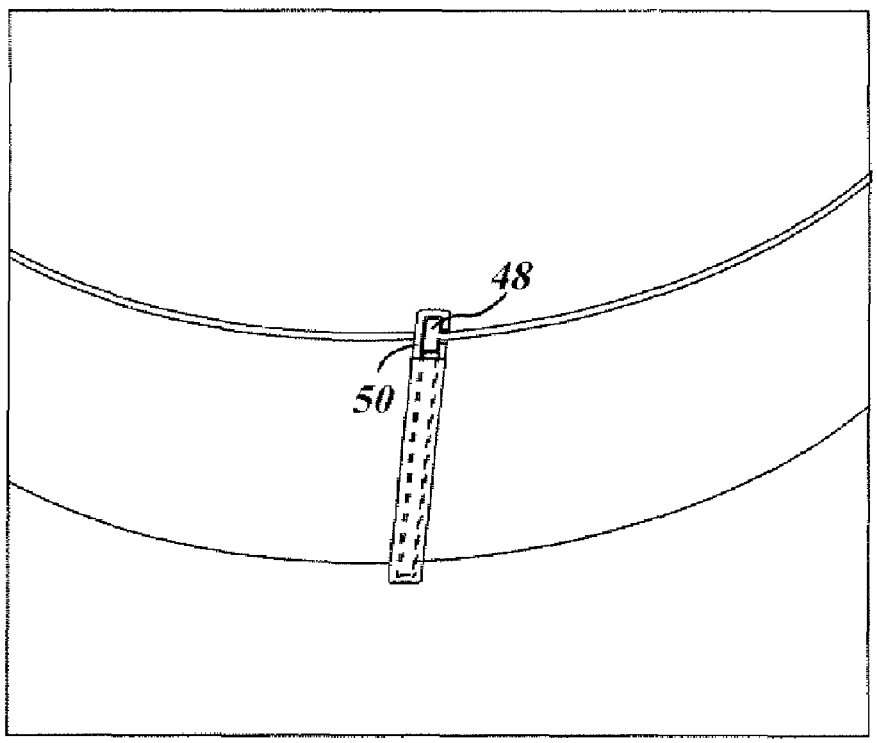
FIG. 4 is a detailed illustration of the assembled duct section assembled from the partial cylinder duct segments manufactured in FIG. 1, the detail illustrating a t-tab and t-slot configuration.

It is contemplated that the duct segments 22 may be joined post-build to form each of the duct sections 12. An improvement contemplates the formation of mechanical lock features 34 (FIGS. 3 and 4) on the first segment end 36 and second segment end 38 of each duct segment 22. These mechanical lock features 34, such as snap-lock features, allow for quick and reliable joining of the segments 22. They also make the duct segments 22 self aligning during assembly to improve assembly and reliability. Additionally, they serve to increase adhesive application area 40 such that application of an adhesive 42 makes for a solid and secure attachment joint. Although a variety of mechanical lock features 34 are contemplated, two specific contemplated embodiments are illustrated including a cup 44 and ball 46 configuration and a t-tab 48 and t-slot 50 configuration. It should be understood that these, and other, configurations may be utilized together or individually to facilitate ease of assembly. By using these features in combination, it can be assured that assembly can only be made in a single configuration. This insures proper assembly. In other embodiments, however, alignment markings 52 may be formed on the segments 22 during the build run to direct assembly operators to insure correct orientation for non-symmetrical builds.

Figure 6:
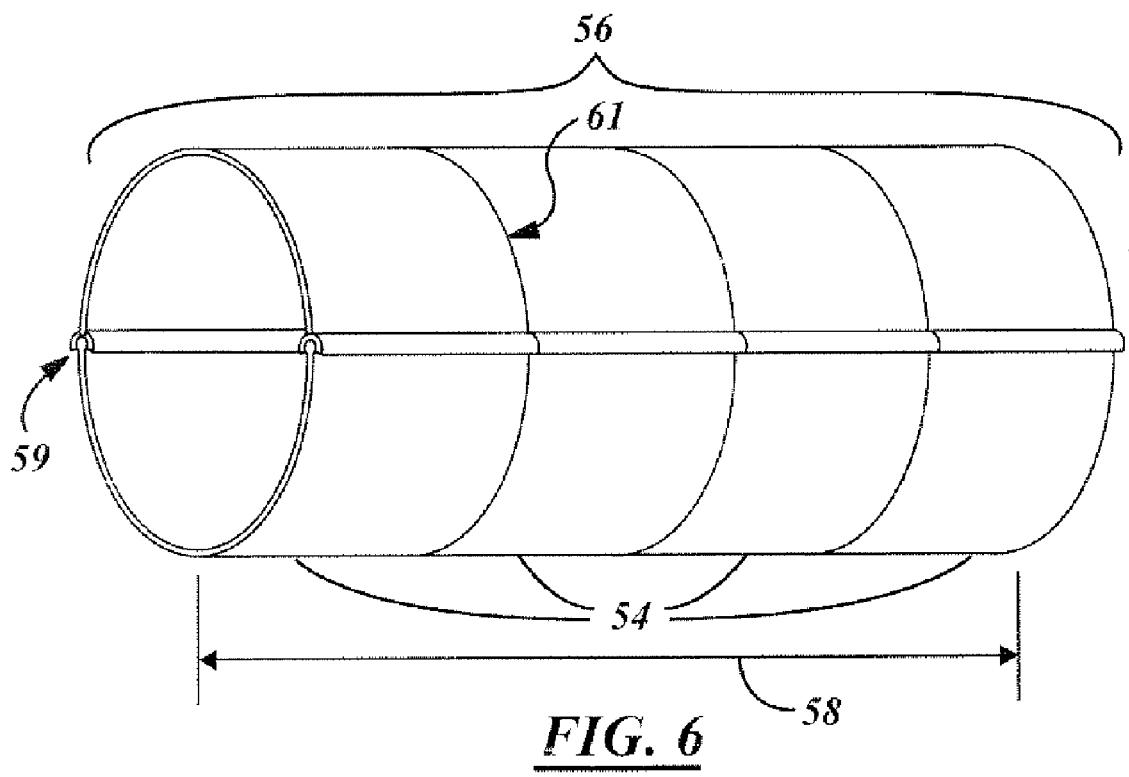
FIG. 6 is an illustration of the elongated duct run assembled from a plurality of assembled duct sections illustrated in FIG. 5.

Although a single duct section 12 may be formed during the single build run, the present invention contemplates the formation of a plurality of duct sections 54 during a single build run. The plurality of duct sections 54 can then be joined together axially into an elongated duct run 56. This allows the manufacturing from a single build run of an element that is not only has a cross-sectional profile 30 greater than the build chamber profile 20, but additionally allows for an elongated duct run 56 with a duct length 58 that exceeds the build length of the direct manufacturing machinery. Thus the present invention provides considerable time and cost savings to existing duct and other part manufacturing. The mechanical lock features 34 have thus far been described in terms of longitudinal joints 59. It should also be understood that they can be formed to facilitate radial joints 61 as well as illustrated in FIG. 6.

Figure 8:
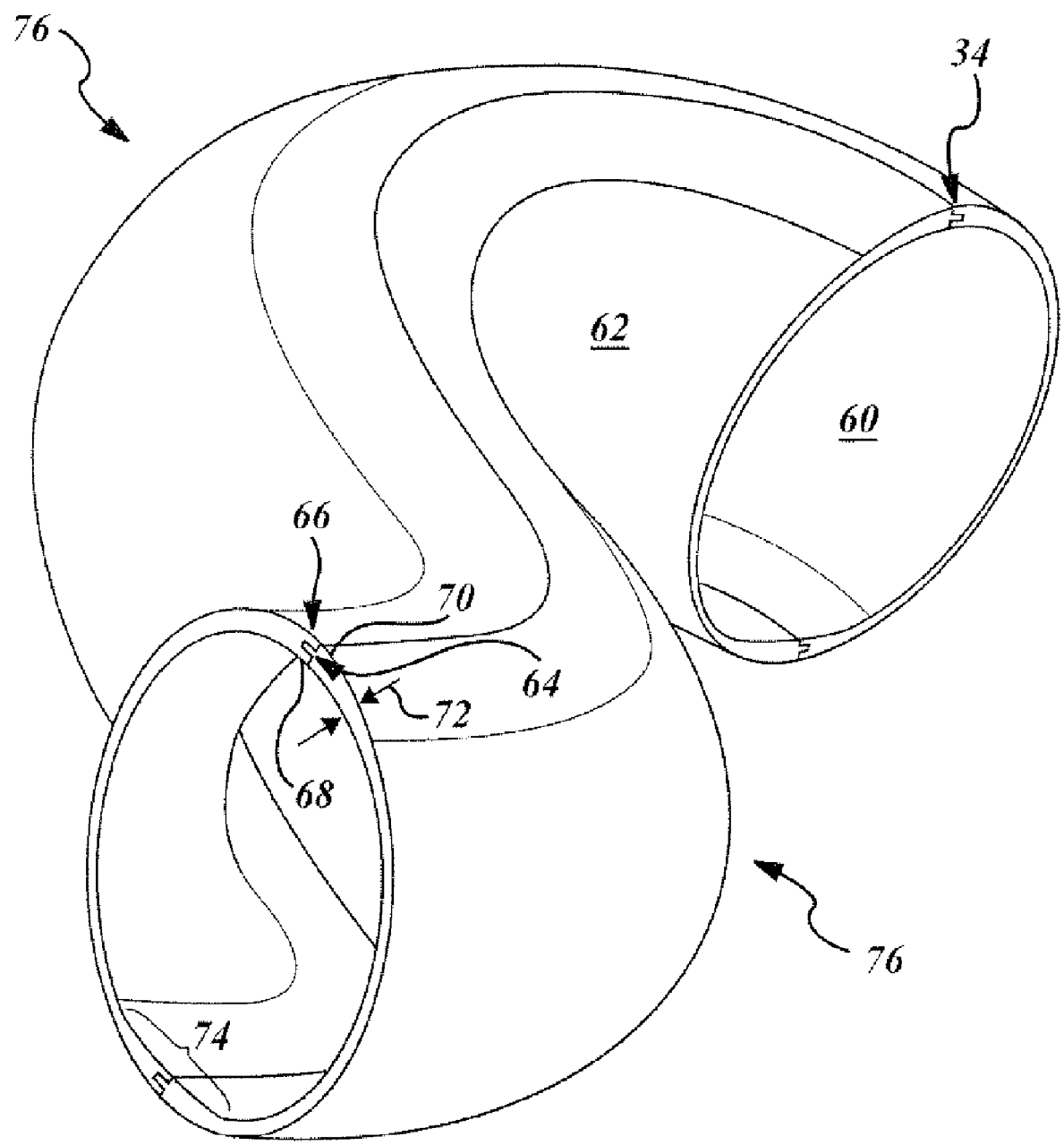
FIG. 8 is an illustration of an alternated embodiment of the assembled duct section, the assembled duct section including a flush-joint assembly.

In still another embodiment illustrated in FIG. 8, it is contemplated that the mechanical lock features 34, or joint section, may be formed such that duct inner surface 60 and duct outer surface 62 remain substantially smooth such that flow through or around the duct section 12 remains substantially laminar. The mechanical lock features 34 may be biased inwards or outwards to provide such smooth inner or outer surface 60,62 depending on design constraints. Additionally this may be accomplished by forming a segment tongue 64 and a segment groove 66 between the segment inner surface 68 and the segment outer surface 70. This allows the segments 22 to be joined while allowing the duct inner and outer surfaces 60,62 to remain substantially smooth. It is further contemplated that the segment sidewall thickness 72 be increased in proximity to the joint region 74 such that the tongue and groove 64,66 are adequately supported and structural rigidity is maintained.

Although the present invention has thus far been illustrated as producing fairly linear duct sections 12, it should be understood that the technology is uniquely suited for the simultaneous production of complex duct sections comprising a plurality of duct directional bends 76. By keeping the complex duct section symmetrical along two planes, it remains possible to stack the sections 22 and form them during a single build run. Thus the present invention contemplates formation of a plurality of complex duct shapes during single build runs.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A method for the direct manufacture of aerospace duct elements comprising: executing a single build run on a build chamber using direct fabrication technology to generate at least one duct section, said at least one duct section generated by: forming a plurality of partial cylinder duct segments orientated within said build chamber in a nested arrangement during said single build run, and assembling at least two of said partial cylinder duct segments to form said duct section, said duct section having a duct cross-sectional profile larger than a build chamber profile.

2. A method as described in claim 1, wherein each of said plurality of partial cylinder duct segments includes a first segment end and a second segment end, said first segment end and said second segment end including mechanical lock features adapted to secure said at least two of said partial cylinder duct segments together to form said duct section.

3. A method as described in claim 2, wherein said mechanical lock features comprise cup and ball configurations.

4. A method as described in claim 2, wherein said mechanical lock features comprise cup t-tab and t-slot configurations.

5. A method as described in claim 2, further comprising: applying adhesive in between said partial cylinder duct segments prior to assembly of said duct section, said mechanical lock features maximizing an adhesive application area.

6. A method as described in claim 2, wherein said mechanical lock features comprise: a segment tongue formed between a first segment inner surface and a first segment outer surface; and a segment groove formed between a second segment inner surface and a second segment outer surface.

7. A method as described in claim 2, wherein a substantially smooth duct outer surface is generated.

8. A method as described in claim 2, wherein a substantially smooth duct inner surface is generated.

9. A method as described in claim 1, wherein said partial cylinder duct segments comprise complex duct sections comprising a plurality of duct directional bends.

10. A method as described in claim 1, wherein said partial cylinder duct segments comprise half cylinder duct segments.

11. A method as described in claim 1, wherein said partial cylinder duct segments comprise quarter cylinder duct segments.

12. A method as described in claim 1, wherein said direct metal fabricating comprises selective laser sintering.

13. A method as described in claim 1, wherein said plurality of partial cylinder duct segments comprise varying segment effective radii such that a plurality of duct segments having varying duct diameters may be manufactured during said single build run.

14. A method as described in claim 1, further comprising: generating a plurality of duct segments; and joining said plurality of duct segments to form an elongated duct run.

15. A method as described in claim 14, further comprising: forming radial joints onto said duct segments during said single build run; and joining said plurality of duct segments using said radial joints.

16. A method as described in claim 2, wherein said mechanical lock features comprise snap-fit mechanical lock features.

17. A method as described in claim 1, wherein said plurality of partial cylinder duct segments comprises segment effective radii maximized to make efficient use of said build chamber profile.

18. A method as described in claim 1, further comprising: forming alignment markings into said plurality of partial cylinder duct segments during said single build run.

19. A method for the direct manufacture of aerospace cylindrical elements comprising: executing a single build run on a build chamber using direct fabrication technology to generate at least one cylindrical section, said at least one cylindrical section generated by: forming at least two partial cylinder segments within said build chamber during said single build run, and assembling said partial cylinder segments to form said cylindrical section, said cylindrical section having a cylindrical cross-sectional profile larger than a build chamber profile.

20. A method as described in claim 19, wherein each of said partial cylinder segments include a first segment end and a second segment end, said first segment end and said second segment end including mechanical lock features adapted to secure said partial cylinder segments together to form said cylindrical section.

21. A method as described in claim 20, further comprising: applying adhesive in between said partial cylinder segments prior to assembly of said cylindrical section, said mechanical lock features maximizing an adhesive application area.

22. A method as described in claim 19, wherein said partial cylinder segments comprise half cylinder segments.

23. A method as described in claim 19, wherein said partial cylinder segments comprise quarter cylinder segments.

24. A method as described in claim 20, wherein said mechanical lock features comprise snap-fit mechanical lock features.

25. A method as described in claim 19, wherein said direct metal fabricating comprises selective laser sintering.

26. A method as described in claim 19, wherein said plurality of partial cylinder segments comprise varying segment effective radii such that a plurality of cylindrical segments having varying cylindrical diameters may be manufactured during said single build run.

27. A method as described in claim 19, further comprising: generating a plurality of cylindrical segments; and joining said plurality of cylindrical segments to form an elongated cylindrical run.

28. A method as described in claim 19, wherein said plurality of partial cylinder segments comprises segment effective radii maximized to make efficient use of said build chamber profile.

29. A method as described in claim 1, further comprising: forming alignment markings into said plurality of partial cylinder segments during said single build run.

30. A method for the direct manufacture of aerospace elements comprising: executing a single build run on a build chamber using direct fabrication technology to generate at least one element, said at least one element generated by; forming a plurality of partial segments orientated within said build chamber in a nested arrangement during said single build run, and assembling at least two of said partial segments to form said element, said element having a duct cross-sectional profile larger than a build chamber profile.

31. A method as described in claim 30, wherein each of said plurality of partial segments includes a first segment end and a second segment end, said first segment end and said second segment end including mechanical lock features adapted to secure said at least two of said partial segments together to form said element.

* * * * *